United States Patent
Abu-Dayya

[11] Patent Number: 5,991,273
[45] Date of Patent: Nov. 23, 1999

[54] DETERMINING SINR IN A COMMUNICATIONS SYSTEM

[75] Inventor: Adnan Abu-Dayya, Ottawa, Canada

[73] Assignee: Nortel Networks Corporation, Montreal, Canada

[21] Appl. No.: 08/850,102

[22] Filed: May 1, 1997

[51] Int. Cl.[6] .................................................. H04L 1/02
[52] U.S. Cl. .................................... 370/252; 375/347
[58] Field of Search .................................. 370/320, 321, 370/342, 350, 503, 252, 458; 375/347, 348, 346; 455/101, 226.3

[56] References Cited

U.S. PATENT DOCUMENTS

| | | | |
|---|---|---|---|
| 5,369,412 | 11/1994 | Tsujimoto | 342/380 |
| 5,524,023 | 6/1996 | Tsujimoto | 375/232 |
| 5,623,484 | 4/1997 | Muszynski | 370/335 |
| 5,680,419 | 10/1997 | Bottomley | 375/347 |
| 5,787,131 | 7/1998 | Bottomley | 375/347 |
| 5,819,168 | 10/1998 | Golden et al. | 455/303 |
| 5,838,742 | 11/1998 | Abu-Dayya | 375/347 |

FOREIGN PATENT DOCUMENTS

97/08841  3/1997  WIPO .

OTHER PUBLICATIONS

"An Adaptive Combiner for Co–Channel Interference Reduction in Multi–User Indoor Radio Systems", S.A. Hanna et al., Proc. of the 41st IEEE Vehicular Technology Conference, St.Louis, MO, 19–22 May 1991, pp. 222–227, XP000260183.

"Quality Assessment for Pre–Detection Diversity Switching", A. Brandao et al., Proc. of the 6th IEEE International Symposium on Personal, Indoor and Mobile Radio Communications, New York, NY, 27–29 Sep. 1995, vol.2, pp. 577–581, XP002053987.

*Primary Examiner*—Min Jung
*Attorney, Agent, or Firm*—R. John Haley

[57] ABSTRACT

Diversity path signals, each comprising time division multiplexed symbols in a time slot including known symbols constituting a reference signal, are combined with respective weights to reduce co-channel interference. The weights are determined, from a correlation matrix and a reference signal correlation vector, using a sliding window starting with synchronization symbols and/or CDVCC (coded digital verification color code) symbols as the known symbols. SINR (signal to interference plus noise ratio) is determined for each window position from elements of the correlation matrix and the reference signal correlation vector. The determined SINRs are averaged through the time slot, over a plurality of time slots, and for the diversity paths to provide an accurate determination of SINR within a short period. The SINR provides a reliable signal quality parameter that is useful in a cellular communications system for procedures such as hand-off, adaptive channel allocation, dynamic power control, and cell tiering.

20 Claims, 3 Drawing Sheets

DETERMINING SINR IN A COMMUNICATIONS SYSTEM

This invention relates to determining SINR (Signal to Interference plus Noise power Ratio) in a communications system. The invention is particularly applicable to TDMA (Time Division Multiple Access) cellular radio or wireless communications systems, including GSM (Global System for Mobile Communications).

CROSS REFERENCE TO RELATED APPLICATION

Reference is directed to my U.S. patent application Ser. No. 08/730,828 filed Oct. 17, 1996 and entitled "Diversity Path Co-Channel Interference Reduction", the entire disclosure of which is hereby incorporated herein by reference.

BACKGROUND OF THE INVENTION

In a communications system, such as a cellular radio system using TDMA for communications on the so-called reverse or upstream channel from a terminal to a base station, it is known that the SINR of a received signal can be used as a signal quality parameter for various procedures such as hand-off, adaptive channel allocation, dynamic power control, and cell tiering.

The channel characteristics fluctuate with time and the received signals are subject to fading, so that averaging over a number of time slots of the channel is necessary to obtain a sufficiently accurate determination (measurement or estimation) of the SINR. The number of time slots over which averaging is necessary depends on the manner in which the SINR is determined, but in any event increases with slower channel fluctuations, and hence with slower speeds of a mobile terminal. To be of practical use, typically SINR estimates accurate to within 1 dB of the average SINR may be required within 2 seconds, during which there may be 100 time slots of the channel.

In view of these factors, practical determination of SINR in real time for use as a signal quality parameter has not readily been achieved. Consequently, the procedures mentioned above have commonly used the received signal strength indicator (RSSI) as a signal quality parameter instead of the SINR, but this is undesirable because the RSSI does not reliably represent the signal quality. For example, the RSSI may be large due to co-channel interference, when the actual signal quality and SINR are small.

An object of this invention, therefore, is to provide an improved method of and apparatus for determining SINR.

SUMMARY OF THE INVENTION

The invention is described below in the context of a space-diversity receiver as described in the related application referred to above. In such a receiver, at least two spaced antennas are provided for producing respective received signals, and a weighted combination of these signals is provided as an optimum received signal for demodulation. Appropriate weights for combining the signals are determined and adaptively changed to accommodate varying interference conditions and signal fading. The SINR is determined from a correlation matrix of the received signals and a reference signal correlation vector which are produced by the calculating unit used to determine the weights.

Thus according to one aspect this invention provides, in a communications system in which diversity path signals, each comprising time division multiplexed symbols in a time slot including known symbols constituting a reference signal, are combined with respective weights to produce a combined signal for demodulation, a method comprising the steps of: determining a correlation matrix of the diversity path signals and a reference signal correlation vector; and determining SINR (signal to interference plus noise power ratio) from the correlation matrix and the reference signal correlation vector.

Conveniently the weights for combining the diversity path signals to produce the combined signal are determined from the correlation matrix and the reference signal correlation vector. The steps of determining the correlation matrix and the reference signal correlation vector and determining SINR can be performed for each of a plurality of groups of known symbols in the time slot, the method further comprising the step of averaging the determined SINR for the plurality of groups of known symbols in the time slot. The SINR is preferably determined for each of the diversity paths, the method further comprising the step of averaging the determined SINRs for the diversity paths. The method preferably further includes the step of averaging the determined SINR for a plurality of time slots.

Another aspect of the invention provides a method of determining SINR (signal to interference plus noise ratio) in a communications system in which diversity path signals are combined with respective weights, the diversity path signals each comprising time division multiplexed symbols in a time slot, comprising the steps of: determining a correlation matrix of the diversity path signals; determining a reference signal correlation vector using as a reference signal known and/or determined symbols in the time slot; determining SINR for each diversity path from elements of the correlation matrix and the reference signal correlation vector; and averaging the determined SINRs for the diversity paths.

Desirably, in an IS-54 system as discussed below, the reference signal comprises synchronization symbols and/or CDVCC (coded digital verification colour code) symbols.

The invention also provides a receiver for receiving via at least two diversity paths signals each comprising time division multiplexed symbols in a time slot including known symbols constituting a reference signal, comprising: buffers for storing symbols of the diversity path signals; a weight calculating unit for determining weights for combining symbols of the diversity path signals from the buffers in dependence upon a correlation matrix of the diversity path signals and a reference signal correlation vector; a signal combiner arranged to combine symbols of the diversity path signals from the buffers in accordance with the respective weights deter-mined by the weight calculating unit to produce a combined signal; and an SINR (signal to interference plus noise power ratio) estimator responsive to elements of the correlation matlix and the reference signal correlation vector for determining SINR of at least one of the diversity path signals.

BRIEF DESCRIPTION OF THE DRAWINGS

The invention will be further understood from the following description with reference to the accompanying drawings, in which.

DETAILED DESCRIPTION

Figure 1:
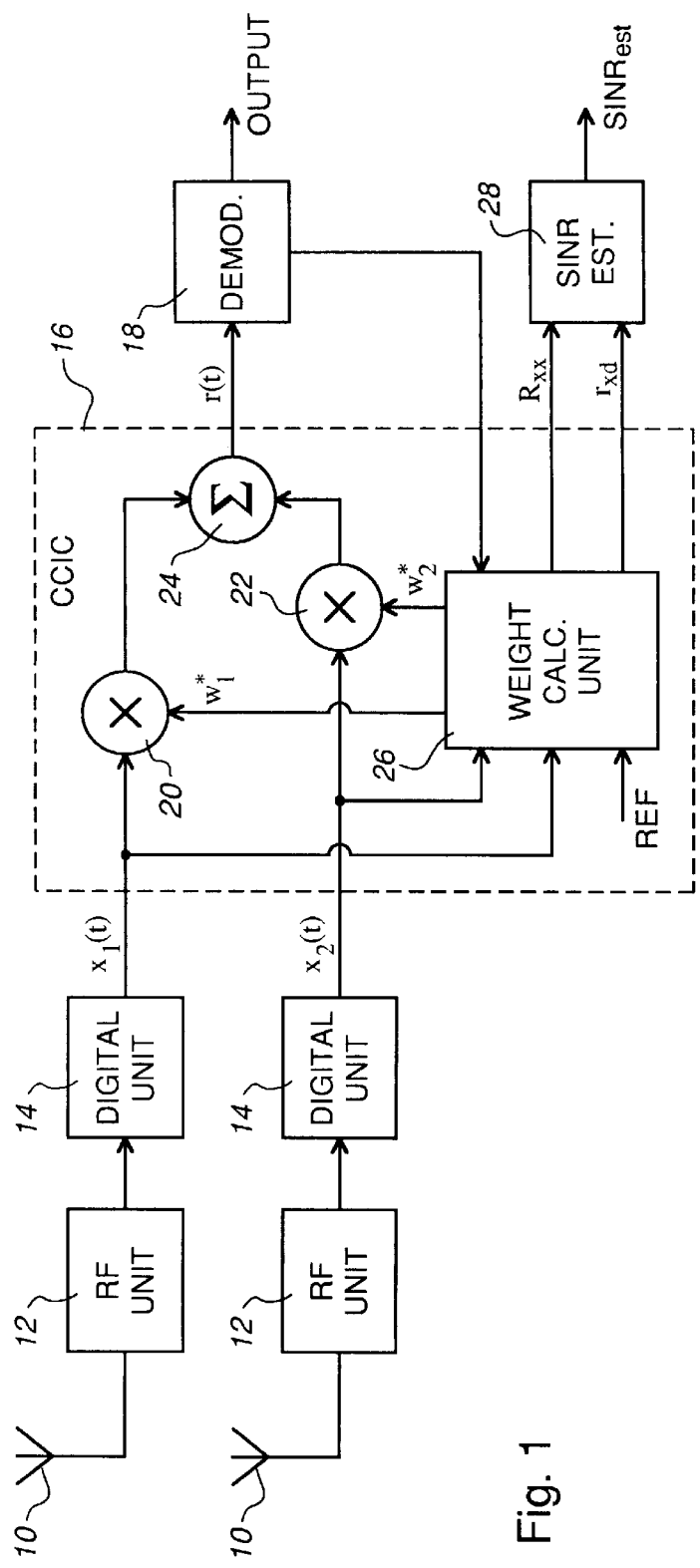
FIG. 1 schematically illustrates a block diagram of parts of a TDMA cellular radio communications receiver incorporating this invention.

Referring to FIG. 1, a block diagram illustrates parts of a cellular radio communications receiver having in this case two diversity paths each including a respective antenna 10, RF (radio frequency) front-end unit 12, and digital unit 14 providing a respective one of two digital diversity path sampled signals $x_1(t)$ and $x_2(t)$. Each digital unit 14 for example includes, as is known in the art, a sampler and analog-digital converter, a digital receive filter, and clock recovery and frame synchronization functions, and together with subsequent functions of the receiver can be constituted by functions of one or more digital signal processor (DSP) integrated circuits. The two antennas 10 are physically spaced apart to provide two diversity paths. More than two diversity paths can be provided, and their signals can be combined, in a similar manner, but for clarity and simplicity it is assumed in most of this description that there are only two diversity paths as shown in FIG. 1.

The complex signals $x_1(t)$ and $x_2(t)$ are weighted and combined in a co-channel interference (CCI) reducer or canceller (CCIC) 16, shown within a dashed-line box in FIG. 1, to produce an optimum received signal r(t), which is supplied to a demodulator 18 to produce a signal output. The demodulator 18 also supplies a feedback signal to the CCIC 16 for adaptively changing the weightings of the diversity path signals $x_1(t)$ and $x_2(t)$ as is further described below.

The CCIC 16 comprises multipliers 20 and 22, a summing unit 24, and a weight calculation unit 26. The unit 26 is supplied with the signals $x_1(t)$ and $x_2(t)$, the feedback signal from the demodulator 18, and reference signals REF, and serves to produce weights $w_1^*$ and $w_2^*$ as described below, the superscript * representing conjugation. The multipliers 22 and 24 are supplied with the signals $x_1(t)$ and $x_2(t)$ respectively and with the weights $w_1^*$ and $w_2^*$ respectively; products of these signals are supplied to and added by the summing unit 24 to produce the signal r(t).

The receiver also includes an SINR estimator 28, which is supplied with a matrix $R_{xx}$ and a vector $r_{xd}$ which are produced as described below by the weight calculation unit 26. The estimator 28 produces an estimate $SINR_{est}$ of the SINR as described in detail below.

Figure 2:
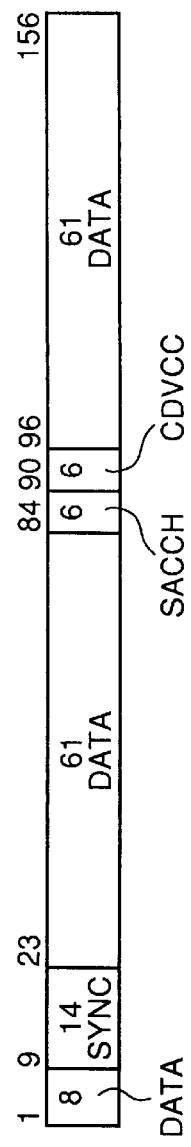
FIG. 2 illustrates a known form of TDMA time slot.

In the following description it is assumed that the receiver of FIG. 1 is operable in a TDMA cellular radio system compatible with EIA/TIA document IS-54-B: Cellular System Dual-Mode Mobile Station—Base Station Compatibility Standard (Rev. B), referred to here simply as an IS-54 system. As shown in FIG. 2, each time slot of an IS-54 system provides for the communication of 156 symbols comprising, in order, 8 data symbols (symbols 1 to 8 of the time slot), 14 symbols (9 to 22) forming a synchronizing word SYNC, a further 61 data symbols (23 to 83), 6 symbols (84 to 89) of a slow associated control channel SACCH, 6 symbols (90 to 95) of a coded digital verification colour code CDVCC, and a fuither 61 data symbols (96 to 156). The SYNC and CDVCC symbols represent information that is known to the receiver and constitute the reference signals REF referred to above.

An IS-54 system uses π/4 shifted DQPSK (differential quadrature phase shift keyed) modulation for which the complex baseband representation S(t) of the transmitted signal is given by:

$$S(t) = \sum_{i=-\infty}^{\infty} s_i h_T(t - iT) \quad (1)$$

where t is time, $s_i$ is the complex symbol transmitted during the symbol interval i, $h_T(t)$ is the impulse response of the transmit filter, and T is the symbol interval. The symbol $s_i$ is differentially encoded as $s_i = s_{i-1} (a_i + jb_i)/\sqrt{2}$ where $a_i$ and $b_i$ are each ±1 and represent the information bits of the symbol i, and $s_i$ has any of the values exp (jπk/4), k=0, ... 7 with equal probability.

Assuming that fading is not frequency-dependent (equalization can be used to compensate for frequency-dependent fading), then the transmission channel can be represented by a complex multiplicative fading factor of the form U(t)=A(t) exp (jγ(t)) where A(t) and γ(t) are the random amplitude and the random phase, respectively, of the fading factor.

After passing through the transmission channel, the signal received by each of the diversity antennas 10 is filtered by the receive filter in the digital unit 14, the cascade of the transmit and receive filters having a raised-cosine spectral characteristic. Assuming perfect sampling phase information for simplicity, then the signal at the output of the receive filter, and hence at the output of the digital unit 14, for the diversity path n and the symbol interval k and hence at the time t =kT is given by:

$$x_n(kT) = g_n(kT)S_d(kT) + \sum_{j=1}^{L} u_{n,j}(kT)S_j(kT) + \zeta_n(kT) \quad (2)$$

where $g_n(kT)$ and $u_{n,j}(kT)$ are the fading factors affecting respectively the desired signal $S_d(kT)$ and the j-th one of L co-channel interfering signals signal $S_j(kT)$, and $\zeta_n(kT)$ is the filtered complex Gaussian noise with zero mean and variance $\sigma_n^2$, in the diversity path n.

For the case of two diversity paths, the output of the CCIC 16 is given by:

$$r(kT) = w_1^*(kT)x_1(kT) + w_2^*(kT)x_2(kT) \quad (3)$$

Putting n=1 and n=2 for the two diversity paths in equation (2) and substituting for $x_1(kT)$ and $x_2(kT)$ in equation (3) gives:

$$r(kT) = (w_1^*(kT)g_1(kT) + w_2^*(kT)g_2(kT))s_k + \quad (4)$$
$$\sum_{j=1}^{L} (w_1^*(kT)u_{1,j}(kT) + w_2^*(kT)u_{2,j}(kT))S_j(kT) +$$
$$(w_1^*(kT)\zeta_1(kT) + w_2^*(kT)\zeta_2(kT))$$

Using equation (4), the following expression can be derived for the signal to interference plus noise power ratio (SINR) at the output of the CCIC 16 at the time t=kT:

$$SINR(k) = \frac{|w_1^*(kT)g_1(kT) + w_2^*(kT)g_2(kT)|^2}{\sum_{j=1}^{L} |w_1^*(kT)u_{1,j}(kT) + w_2^*(kT)u_{2,j}(kT)|^2 + P_N} \quad (5)$$

where $P_N$ is the noise power at the output of the CCIC 16 and is given by:

$$P_N = |w_1^*(kT)\zeta_1(kT) + w_2^*(kT)\zeta_2(kT)|^2 \tag{6}$$

For optimum co-channel interference reduction by the CCIC 16 it is necessary to minimize the mean-squared error (MSE) at the output of the demodulator 18, or equivalently to maximize the SINR at the output of the CCIC 16. If the vector X(t) denotes the diversity path signals $x_1(t)$ and $x_2(t)$, i.e. if:

$$X(t) = [x_1(t) x_2(t)]^T \tag{7}$$

where the superscript T denotes transpose, then it can be shown that the set of weights that minimizes the MSE at the output of the demodulator (or maximizes the SINR at the output of the CCIC 16) is given by:

$$W(t) = \begin{bmatrix} w_1(t) \\ w_2(t) \end{bmatrix} = R_{xx}^{-1}(t) r_{xd}(t) \tag{8}$$

where $R_{xx}$ represents the correlation matrix of the received signals and $r_{xd}$ represents the reference signal correlation vector, given by:

$$R_{xx}(t) = E[X(t)X^{*T}(t)] \tag{9}$$

$$r_{xd}(t) = E[X(t)d^*(t)] \tag{10}$$

where E[.] denotes expectation, $X^{*T}(t)$ is the transpose of the complex conjugate of X(t), and d(t) is a reference signal that is correlated with the desired signal. As indicated above, the reference signal is constituted by the SYNC and CDVCC signals. This implies that frame synchronization must first be established, but this is necessary for any kind of diversity combining of signals.

As described below, a number of symbols within a limited-size window are used to approximate the correlation matrix $R_{xx}$ and the correlation vector $r_{xd}$, thereby to determine an optimum set of weights W(t); this is referred to as weight acquisition. Such weights could, if fading of the desired and interfering signals were very slow relative to the duration of the time slot, be used throughout the time slot. In practice this is generally not the case. Consequently, a weight tracking procedure is used after the weight acquisition procedure to maintain an optimum set of weights throughout the time slot; this involves moving the window progressively through the time slot of the desired signal.

The weight acquisition and weight tracking procedures are described below with reference to FIG. 3, which illustrates the first part of a time slot of the desired signal and, below this, illustrations representing a sequence of steps F1, F2, etc.

Figure 3:
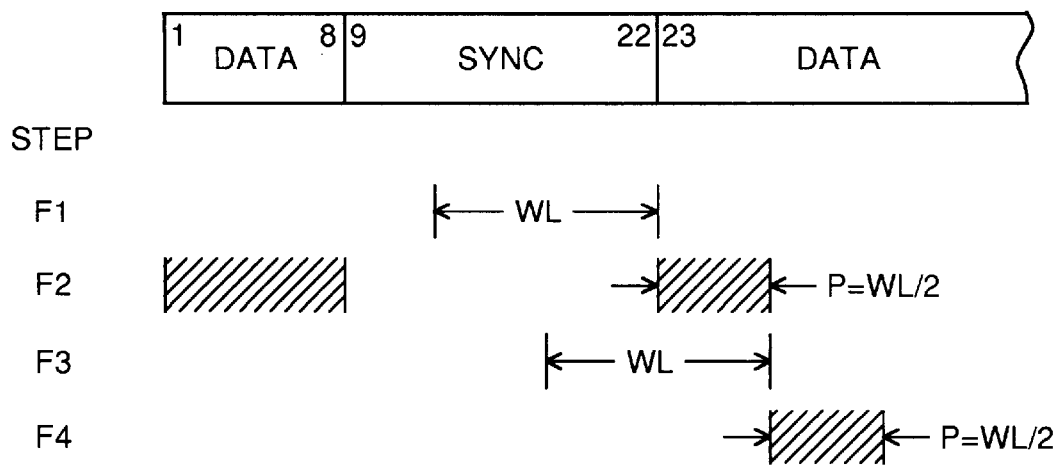
FIG. 3 is a diagram with reference to which operation of a CCIC (co-channel interference canceller) of the receiver of FIG. 1 is explained.

Referring to FIG. 3, in a first step F1 a window of length WL symbols is defined by the last WL≦14 symbols of the known synchronization word SYNC at symbols 9 to 22 of the time slot. A large value of WL is desirable for good statistical averaging as required by equations (9) and (10), and a small value of WL is desirable to avoid channel time fluctuations within the window; the latter may be a predominant factor in fast fading situations. Accordingly, the window size WL is a compromise between these factors. By way of example, the illustration in FIG. 3 corresponds to the case of WL=10, but it can be seen that the same principles can be applied for other window sizes.

The WL symbol samples in the window are then used to approximate the correlation matrix $R_{xx}$ and the reference signal correlation vector $r_{xd}$. In other words, the correlation matrix is approximated by:

$$R_{xx} = \sum_{k=1}^{WL} X(k) X^{*T}(k) \tag{11}$$

and the reference signal correlation vector is approximated by:

$$r_{xd} = \sum_{k=1}^{WL} X(k) d^*(k) \tag{12}$$

The optimum set of weights W is then determined from the correlation matrix $R_{xx}$ and the reference signal correlation vector $r_{xd}$ in accordance with equation (8). For the case of two diversity paths and hence two weights $w_1$ and $w_2$ described here, direct matrix inversion (DMI) is preferred to determine the weights $w_1$ and $w_2$ because the correlation matrix $R_{xx}$ is a 2 by 2 matrix for which DMI involves very little computation. DMI also has an advantage of better convergence than other known techniques, such as least mean squared (LMS) error estimation of the weights. However, for larger numbers of diversity paths, for example for 4 or more diversity paths, the LMS technique involves less computation than, and may be preferred over, DMI.

Thus step F1 in FIG. 3 comprises determining the correlation matrix $R_{xx}$ and the reference signal correlation vector $r_{xd}$, and hence an initial set of weights, from the WL received symbol samples in the window, using the known synchronization word SYNC as a reference signal.

In a second step F2 in FIG. 3, this set of weights is applied in the CCIC 16 to combine the diversity path signal samples $x_1(t)$ and $x_2(t)$ for each of a number P of data symbols immediately following the synchronization word SYNC. Generally P can be any integer, but it is preferably in the range 1≦P<WL so that there is an overlap between consecutive positions of the window as described further below. P is desirably chosen, as is illustrated in FIG. 3, to be equal to about half the window size, i.e. P=WL/2. The resulting combined symbols r(t) are demodulated by the demodulator 18. Hatching (diagonal lines) is used in FIG. 3 to denote these steps of combining and demodulating the received samples. As is also illustrated by hatching in FIG. 3, in the step F2 each of the 8 data symbols preceding the synchronization word SYNC is also combined and demodulated using the same initial set of weights determined in the step F1.

In a third step F3 in FIG. 3, the window is moved forwards (to the right in FIG. 3) by P symbols, and a new correlation mattix $R_{xx}$ and reference signal correlation vector $r_{xd}$, and hence a new set of weights, are determined in the same manner as in step F1 using as the reference the symbols in the moved window. These symbols are now known, because they are either part of the synchronization word SYNC or they are provided by the feedback signal to the weight calculation unit 26 of the CCIC 16 from the demodulator 18 as a consequence of the demodulation in the step F2. It can be seen that in the preferred case of 1≦P<WL the moved window position in the step F3 overlaps the previous position of the window in the step F1. With P being equal to about half the window size as shown in FIG. 3 there is an overlap of about 50%, which can be an optimal choice considering conflicting requirements for accurate weight tracking and minimal computation.

In a fourth step F4 in FIG. 3, again as shown by hatching, the new set of weights is applied in the CCIC 16 to combine the diversity path signal samples $x_1(t)$ and $x_2(t)$ for each of a number P of data symbols immediately following the window, and the resulting combined symbols r(t) are demodulated by the demodulator 18.

These steps F3 and F4 are subsequently repeated in turn, with the window being moved forwards progressively through the time slot, until all of the symbols in the time slot have been demodulated. A difference is made with respect to the CDVCC symbols, in that this is information known to the receiver and accordingly the known information is used to constitute the reference for these symbols rather than the symbols fed back to the CCIC 16 by the demodulator 18.

Correspondingly, the known CDVCC symbols can themselves be used, either alone or preferably in conjunction with the known SYNC symbols as described above, to determine optimum weights for combining the diversity path signals in the rest of the time slot. Thus the procedure described above with reference to FIG. 3 can be applied, using the CDVCC symbols as a reference signal to determine an initial set of weights in the same manner as described above, in the forwards direction for the final 61 data symbols in the time slot. In a similar manner, as described fully in the application referred to above, a window can be moved progressively backwards from the CDVCC symbols for the information between the SYNC and the CDVCC symbols in the time slot. The same backwards direction procedure can be applied from the SYNC symbols for the first 8 data symbols in the time slot.

Figure 4:
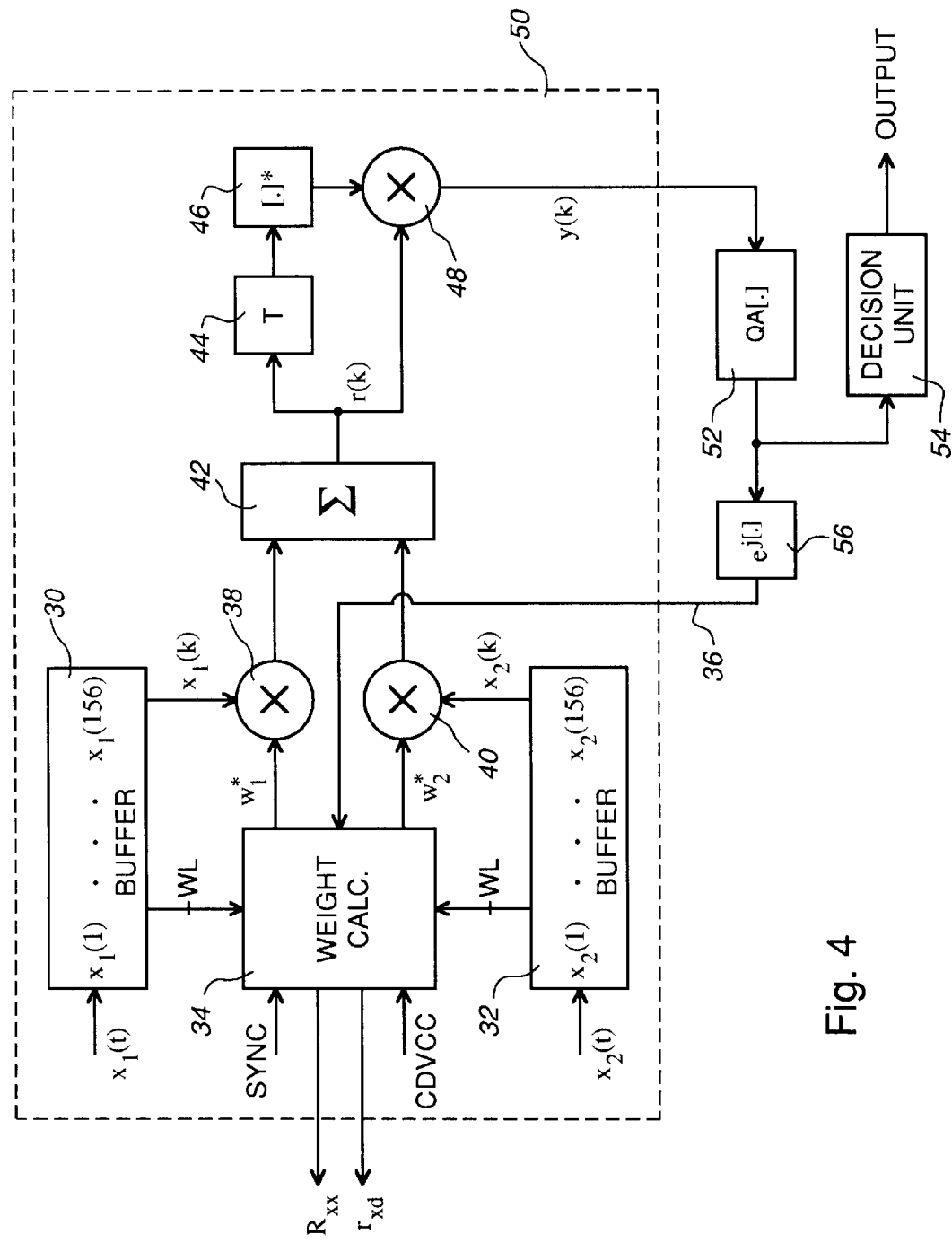
FIG. 4 schematically illustrates one form of the CCIC.

FIG. 4 illustrates, for the case of two diversity paths, an arrangement of functions of the CCIC 16 and demodulator 18 for implementing the procedure of FIG. 3. As already mentioned, these functions can be implemented as functions of a DSP integrated circuit.

The arrangement of FIG. 4 comprises a buffer 30 for the symbol-spaced open-eye complex signal samples $x_1(1)$ to $x_1(156)$ of one time slot for the diversity path signal $x_1(t)$, and a similar buffer 32 for the corresponding samples $x_2(1)$ to $x_2(156)$ of the other diversity path signal $x_2(t)$. It also comprises a weight calculator 34 which is supplied with WL moving window samples from each of the buffers 30 and 32, the known SYNC and CDVCC symbol information, and demodulated signals from a path 36. For each symbol k, the weight calculator 34 produces the optimum weights $w_1^*$ and $w_2^*$ with which the diversity path symbols $x_1(k)$ and $x_2(k)$ respectively are multiplied in complex signal multipliers 38 and 40 respectively, the products being summed in a complex signal summer 42 to produce the resultant signal r(k). The signal r(k) is differentially demodulated using a one-symbol (T) delay 44, complex conjugation 46, and complex signal multiplier 48 to produce a complex signal, referred to here as a soft decision, y(k). These functions of the arrangement are shown within a dashed-line box 50. In determining the optimum weights as described above, the weight calculator 34 produces the correlation matrix $R_{xx}$ and the reference signal correlation vector $r_{xd}$ for each position of the moving window in accordance with equations (11) and (12), corresponding to equations (9) and (10).

A function 52 is supplied with the soft decision y(k) and maps the phase angle θ of this to a quantized angle in accordance with the Table below. The quantized angle is supplied to a decision unit 54, which produces decoded output dibits a and b as also shown by the Table. In addition, the quantized angle is supplied to an exponential function unit 56 which determines the complex symbol which is associated with the quantized angle, this complex symbol being supplied on the path 36 as the feedback signal from the demodulator to the weight calculator 34.

| Angle of y(k) | Quant. angle | a | b |
|---|---|---|---|
| $0 \leq \theta \leq \pi/2$ | $\pi/4$ | 0 | 0 |
| $\pi/2 < \theta \leq \pi$ | $3\pi/4$ | 0 | 1 |
| $\pi \leq \theta \leq 3\pi/2$ | $-3\pi/4$ | 1 | 1 |
| $3\pi/2 < \theta \leq 2\pi$ | $-\pi/4$ | 1 | 0 |

If the channel gains of the first and second diversity paths are respectively $g_1$ and $g_2$ for the desired signal and $u_{1,j}$ and $u_{2,j}$ for an interfering signal j which is one of L co-channel interference signals, then, assuming that the gains are constant during the averaging period and are mutually uncorrelated, then the correlation matrix $R_{xx}$ in equation (9) can be expressed as:

$$R_{xx}(t) = E[X(t)X^{*T}(t)] = \begin{bmatrix} R(1,1) & R(1,2) \\ R(2,1) & R(2,2) \end{bmatrix} \quad (13)$$

where R(1,1), R(1,2), R(2,1), and R(2,2) are the elements of the correlation matrix $R_{xx}$ and are given by:

$$R(1,1) = E[|x_1(t)|^2] = |g_1|^2 + \sum_{j=1}^{L} |u_{1,j}|^2 + \sigma_\zeta^2 \quad (14)$$

$$R(1,2) = E[x_1(t)x_2^*(t)] = g_1 g_2^* + \sum_{j=1}^{L} u_{1,j} u_{2,j}^* \quad (15)$$

$$R(2,1) = E[x_2(t)x_1^*(t)] = g_1^* g_2 + \sum_{j=1}^{L} u_{1,j}^* u_{2,j} \quad (16)$$

$$R(2,2) = [|x_2(t)|^2] = |g_2|^2 + \sum_{j=1}^{L} |u_{2,j}|^2 + \sigma_\zeta^2 \quad (17)$$

and $\sigma_\zeta^2$ is the noise variance. On the right-hand side of each of equations 14 and 17, the first term corresponds to the desired signal and the second term corresponds to the interfering signal. Similarly, the reference signal correlation vector in equation (10) can be expressed as:

$$r_{xd}(t) = E[X(t)d^*(t)] = \begin{bmatrix} g_1 \\ g_2 \end{bmatrix} \quad (18)$$

Consequently, for each diversity path the channel gain for the desired signal is represented by a respective one of the elements, denoted $r_{xd}(1)$ and $r_{xd}(2)$, of the reference signal correlation vector. Denoting the power of the desired signal received by the two antennas as $S_1$ and $S_2$, then:

$$S_1 = |r_{xd}(1)|^2 = |g_1|^2 \quad (19)$$

$$S_2 = |r_{xd}(2)|^2 = |g_2|^2 \quad (20)$$

Denoting the power of the interference plus noise received by the two antennas as $I_1$ and $I_2$, then from equations 14, 19 and 17, 20 it can be seen that:

$$I_1 = \sum_{j=1}^{L} |u_{1,j}|^2 + \sigma_\zeta^2 = R(1,1) - |g_1|^2 = R(1,1) - |r_{xd}(1)|^2 \quad (21)$$

-continued $$I_2 = \sum_{j=1}^{L} |u_{2,j}|^2 + \sigma_\zeta^2 = R(2,2) - |g_2|^2 = R(2,2) - |r_{xd}(2)|^2 \quad (22)$$

From equations (19) to (22) it can be seen that the power of the desired signal and the power of the interference plus noise are represented by the elements of the correlation matrix $R_{xx}$ and the reference signal correlation vector $r_{xd}$, these elements being produced by the weight calculator 34 for each position of the moving window as described above. Thus the ratio of these powers, i.e. the SINR, can be determined from these elements.

As explained in the background of the invention, the SINR must be averaged to reduce the effects of channel fluctuations and signal fading. The embodiment of the invention described below has three aspects to this averaging. Firstly, averaging is applied to the signal and interference plus noise powers for the different window positions, for each of which the elements of the correlation matrix $R_{xx}$ and the reference signal correlation vector $r_{xd}$ are produced, in each time slot. Secondly, averaging is applied for a number of consecutive time slots received from the same terminal. Thirdly, averaging of the determinations for the two (or more) diversity paths is performed on the basis that, after removing the effects of channel fluctuation and signal fading, shadowing effects for the two diversity paths are highly correlated so that the received powers are similar for the different diversity paths. However, these aspects of the averaging may alternatively be applied selectively.

It can be appreciated that averaging can be applied in a variety of known ways, for example exponential, weighted, or unweighted averaging, and any of these ways may be used to provide desired results. It is assumed here that a simple, unweighted averaging is used, over a number of M determinations of $R_{xx}$ and $r_{xd}$ in each time slot, over N time slots, and for the two diversity paths. The number M depends on the size WL of the window and the extent to which successive window positions overlap as described above. For example, M can be 27 for a window size of WL=10 with P=WL/2 as described above, or 20 for a window size of WL=14. The number N determines the delay in producing the SINR; for example N can be 100 corresponding to a period of 2 seconds. Denoting by the superscript kj the elements of $R_{xx}$ and $r_{xd}$ for the k-th computation of weights in the j-th time slot, where $1 \leq j \leq N$ and $1 \leq k \leq M$, then from equations (19) and (20) the average power Sa of the desired signal is given by:

$$S_a = \frac{1}{2NM} \sum_{j=1}^{N} \sum_{k=1}^{M} \left( |r_{xd}^{kj}(1)|^2 + |r_{xd}^{kj}(2)|^2 \right) \quad (23)$$

and from equations (21) and (22) the average power $I_a$ of the interference plus noise is given by:

$$I_a = \frac{1}{2NM} \sum_{j=1}^{N} \sum_{k=1}^{M} \left( R_{xx}^{kj}(1,1) + R_{xx}^{kj}(2,2) - \left( |r_{xd}^{kj}(1)|^2 + |r_{xd}^{kj}(2)|^2 \right) \right) \quad (24)$$

$$= \frac{1}{2NM} \sum_{j=1}^{N} \sum_{k=1}^{M} \left( R_{xx}^{kj}(1,1) + R_{xx}^{kj}(2,2) \right) - S_a$$

Consequently, the determined SINR is given by the following equation (25):

$$SINR_{est} = \frac{S_a}{I_a} = \frac{\sum_{j=1}^{N} \sum_{k=1}^{M} \left( |r_{xd}^{kj}(1)|^2 + |r_{xd}^{kj}(2)|^2 \right)}{\sum_{j=1}^{N} \sum_{k=1}^{M} \left( R_{xx}^{kj}(1,1) + R_{xx}^{kj}(2,2) - \left( |r_{xd}^{kj}(1)|^2 + |r_{xd}^{kj}(2)|^2 \right) \right)}$$

Figure 5:
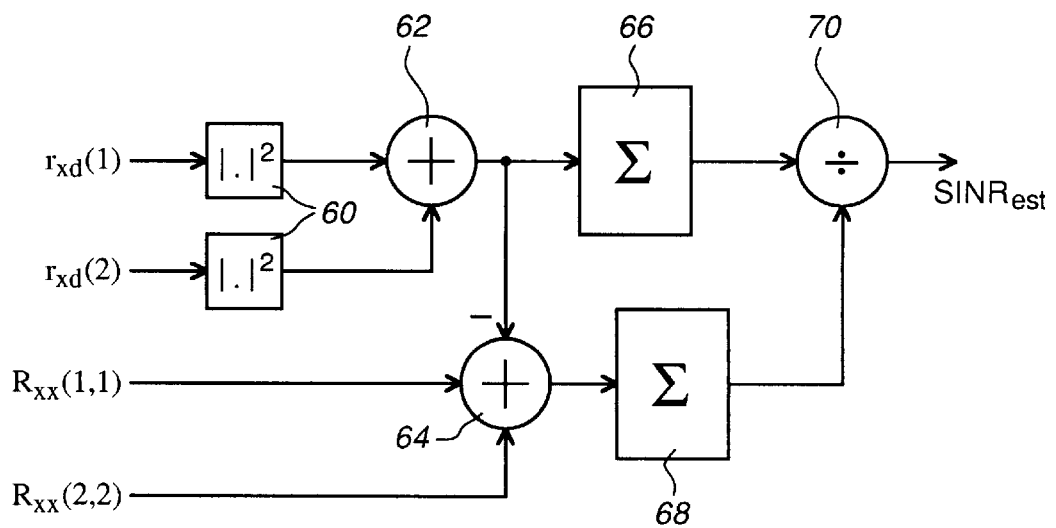
FIG. 5, which is on the same sheet as FIG. 3, schematically illustrates an SINR estimator of the receiver of FIG. 1.

FIG. 5 illustrates one form of the SINR estimator 28 for producing the signal $SINR_{est}$ in accordance with the above description. For each determination of weights by the weight calculator 34, the complex signal elements $r_{xd}(1)$ and $r_{xd}(2)$ of the vector $r_{xd}$ and the real signal elements $R_{xx}(1,1)$ and $R_{xx}(2,2)$ of the matrix $R_{xx}$ are supplied by the weight calculator 34 to the arrangement of FIG. 5. The complex signal elements $r_{xd}(1)$ and $r_{xd}(2)$ are squared by squarers 60 to produce real signals which are summed in an adder 62 whose output constitutes, for each value of k and j, the sum within the brackets in equation (23). The real signal elements $R_{xx}(1,1)$ and $R_{xx}(2,2)$ are summed in, and the sum from the adder 62 is subtracted by, an adder 64 whose output constitutes, for each value of k and j, the contents of the bracketed expression in the first line of equation (24). Units 66 and 68 represented as summers accumulate the NM outputs of the adders 62 and 64 respectively for all of the values of j and k within the averaging period, and the output of the unit 66 is divided by the output of the unit 68 in a divider 70 to produce the signal $SINR_{est}$ in accordance with equation (25).

It can be appreciated from the above description and the arrangement of FIG. 5 that the values of N and M are not involved in the averaging process except to define the averaging period used for producing the estimation of the SINR. It can also be appreciated that these values, and the values of j and k for which the averaging is carried out, may be varied in any desired manner.

It has been found through computer simulations that, in most cases where the SINR is predominantly due to interference rather than noise, the signal $SINR_{est}$ is produced accurately to within about 0.5 to 1 dB of the average SINR within about 1 to 2 seconds. For a diversity combining receiver in which the CCIC arrangement is already provided, the determination of the SINR requires relatively little additional computation, and this can easily be provided in the same digital signal processor. Accordingly, the invention can conveniently provide a practical, real-time, and relatively accurate determination of SINR.

Although the specific arrangement described above relates to only two diversity paths, it can be seen that this can be easily extended for a greater number of diversity paths.

Numerous other modifications, variations, and adaptations may be made to the described embodiment without departing from the scope of the invention as defined in the claims.

What is claimed is:

1. A method of determining SINR (signal to interference plus noise power ratio) in a communications system in which diversity path signals, each comprising a plurality of time division multiplexed symbols in a time slot including known symbols constituting a reference signal, are combined with respective weights to produce a combined signal for demodulation, the method comprising the steps of:
   determining a correlation matrix of the diversity path signals and a reference signal correlation vector; and
   determining SINR from the correlation matrix and the reference signal correlation vector.

2. A method as claimed in claim 1 wherein the weights for combining the diversity path signals to produce the combined signal are determined from the correlation matrix and the reference signal correlation vector.

3. A method as claimed in claim 1 wherein the steps of determining the correlation matrix and the reference signal correlation vector and determining SINR are performed for each of a plurality of groups of known symbols in the time slot, the method further comprising the step of averaging the determined SINR for the plurality of groups of known symbols in the time slot.

4. A method as claimed in claim 3 and including the step of averaging the determined SINR for a plurality of time slots.

5. A method as claimed in claim 4 wherein the SINR is determined for each of the diversity paths, the method fuither comprising the step of averaging the determined SINRs for the diversity paths.

6. A method as claimed in claim 1 and including the step of averaging the determined SINRs for a plurality of time slots.

7. A method as claimed in claim 1 wherein the SINR is determined for each of the diversity paths, the method further comprising the step of averaging the determined SINRs for the diversity paths.

8. A method as claimed in claim 1 wherein, for at least one of the diversity paths, the step of determining SINR comprises determining a signal power by squaring an element of the reference signal correlation vector, determining an interference plus noise power by subtracting the determined signal power from an element of the correlation matrix representing a sum of signal, interference, and noise powers, and dividing the determined signal power by the determined interference plus noise power to deteimine the SINR.

9. A method as claimed in claim 1 wherein the respective weights with which the diversity path signals are combined are produced in dependence upon a respective correlation matrix and reference signal correlation vector for a plurality of positions of a window in the time slot, the method further comprising the step of determining and averaging the SINR for a plurality of the window positions in the time slot.

10. A method as claimed in claim 9 and including the step of averaging the determined SINR for a plurality of time slots.

11. A method as claimed in claim 9 wherein the SINR is determined for each of the diversity paths, the method further comprising the step of averaging the determined SINRs for the diversity paths.

12. A method as claimed in claim 11 and including the step of averaging the determined SINR for a plurality of time slots.

13. A method of determining SINR (signal to interference plus noise ratio) in a communications system in which diversity path signals are combined with respective weights, the diversity path signals each comprising a plurality of time division multiplexed symbols in a time slot, comprising the steps of:

determining a correlation matrix of the diversity path signals;

determining a reference signal correlation vector using as a reference signal known and/or determined symbols in the time slot;

determining SINR for each diversity path from elements of the correlation matrix and the reference signal correlation vector; and averaging the determined SINRs for the diversity paths.

14. A method as claimed in claim 13 and including the step of averaging the determined SINR for a plurality of time slots.

15. A method as claimed in claim 14 wherein the correlation matrix and reference signal correlation vector are determined for a plurality of positions of a window in the time slot, the method further comprising the step of determining and averaging the SINR for a plurality of the window positions in the time slot.

16. A method as claimed in claim 13 wherein the reference signal comprises synchronization symbols and/or CDVCC (coded digital verification colour code) symbols.

17. A receiver for receiving via at least two diversity paths signals each comprising a plurality of time division multiplexed symbols in a time slot including known symbols constituting a reference signal, comprising:

buffers for storing symbols of the diversity path signals;

a weight calculating unit for determining weights for combining symbols of the diversity path signals from the buffers in dependence upon a correlation matrix of the diversity path signals and a reference signal correlation vector;

a signal combiner arranged to combine symbols of the diversity path signals from the buffers in accordance with the respective weights determined by the weight calculating unit to produce a combined signal; and an SINR (signal to interference plus noise power ratio) estimator responsive to elements of the correlation matlix and the reference signal correlation vector for determining SINR of at least one of the diversity path signals.

18. A receiver as claimed in claim 17 wherein the SINR estimator is arranged to determine SINR for each of the diversity path signals and to average the determined SINRs.

19. A receiver as claimed in claim 18 wherein the SINR estimator is arranged to average the determined SINR for a plurality of time slots.

20. A receiver as claimed in claim 19 wherein the SINR estimator is constituted by functions of a digital signal processor.

* * * * *